(12) United States Patent  
Miel et al.

(10) Patent No.: US 8,782,950 B2  
(45) Date of Patent: Jul. 22, 2014

(54) GARDEN POT ASSEMBLY

(75) Inventors: Guy D. Miel, Santa Maria, CA (US); Jason R. Bagby, Orcutt, CA (US); John E. Djafroodi, Orcutt, CA (US)

(73) Assignee: Clearwater Nursery, Inc., Nipomo, CA (US)

( * ) Notice: Subject to any disclaimer, the term of this patent is extended or adjusted under 35 U.S.C. 154(b) by 168 days.

(21) Appl. No.: 13/571,547

(22) Filed: Aug. 10, 2012

(65) Prior Publication Data

US 2014/0041297 A1    Feb. 13, 2014

(51) Int. Cl.  
*A01G 9/02* (2006.01)

(52) U.S. Cl.  
CPC ..................... *A01G 9/028* (2013.01)  
USPC .............................. 47/66.1; 47/85

(58) Field of Classification Search  
CPC ....................................... A01G 9/028  
USPC ........ 47/66.6, 66.1, 79, 59 R, 60, 62 R, 62 A, 47/63, 85–87; 220/510, 23.88, 23.89  
See application file for complete search history.

(56) References Cited

U.S. PATENT DOCUMENTS

| | | | | |
|---|---|---|---|---|
| 2,930,162 | A * | 3/1960 | Mulford | 47/78 |
| 3,682,347 | A * | 8/1972 | Barrier | 206/423 |
| 3,874,548 | A * | 4/1975 | Buff, Jr. | 220/507 |
| 4,803,806 | A * | 2/1989 | Ito | 47/39 |
| 5,094,060 | A | 3/1992 | Caird | |
| 5,282,335 | A * | 2/1994 | Holtkamp, Jr. | 47/81 |
| 6,901,700 | B2 * | 6/2005 | Trabka | 47/86 |
| 7,069,691 | B2 * | 7/2006 | Brooke et al. | 47/59 R |

* cited by examiner

*Primary Examiner* — Kristen C Hayes  
(74) *Attorney, Agent, or Firm* — Dennis L. Thomte; Thomte Patent Law Office LLC

(57) ABSTRACT

A garden pot assembly comprising a pot having an open upper end and a separator tray snap-fitted into the open upper end of the pot. The separator tray has a plurality of spaced-apart plant pot receiving openings formed therein each of which are adapted to receive and support a plant pot therein. The bottom of the pot has a unique structure including a central hub and a plurality of radially extending stand-offs extending outwardly therefrom to the periphery of the bottom wall. The pot or container may be circular, oval, rectangular or square in shape.

12 Claims, 9 Drawing Sheets

GARDEN POT ASSEMBLY

BACKGROUND OF THE INVENTION

1. Field of the Invention

This invention relates to a garden pot assembly which is comprised of a pot having an open upper end and which has a plant separator or arrangement tray snap-fitted within the upper end of the pot with the tray having a plurality of spaced-apart plant pot receiving and supporting openings formed therein.

2. Description of the Related Art

Dish gardens and gardening or garden pots are frequently used to plant a plurality of different species of indoor plants in a shallow dish or pot so that the plants look like a garden scene. It is generally understood that the only difference between a dish garden and a gardening or garden pot is that actual dishware is used in dish gardens.

Planted dish gardens have a number of inherent flaws. The plants in planted dish gardens are usually incompatible in terms of water requirements. Watering one plant adequately will likely result in over-watering another plant which may result in root rot. Invariably, one of the plants in the design will fail before the others fail and there is no simple means of replacing the bad plant. Further, consumers do not like to see soil and many dish garden producers find it necessary to add moss to mask the soil surface. This is costly and may also lead to rotting of the lower leaves of the plant. Assembling planted dish gardens is very labor intensive making the product expensive and making it difficult to accommodate last minute orders. A further concern with the prior art dish gardens and gardening pots are that they are expensive and difficult to assemble.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A garden pot assembly is disclosed which is comprised of a pot having an open upper end and a plant separator or arrangement tray snap-fitted within the upper end of the pot. The assembly of this invention includes a pot having a horizontally disposed circular bottom wall with the pot having a generally cylindrical lower side wall, having upper and lower ends, extending upwardly and outwardly from the periphery of the bottom wall. A ring-shaped shelf, having inner and outer ends, extends laterally outwardly from the upper end of the lower side wall. A generally cylindrical upper side wall, having upper and lower ends, extends upwardly and outwardly from the outer end of the shelf. The lower end of the upper side wall has a snap-in ring groove formed therein which extends laterally outwardly therefrom at the juncture of the upper side wall and the shelf.

The bottom wall of the pot has a hub which extends upwardly therefrom at the center thereof. A plurality of elongated, upstanding, spaced-apart stand-offs extend radially outwardly from the hub to the periphery of the bottom wall.

The separator tray of this invention includes a horizontally disposed circular top wall and an outer side wall which extends downwardly from the periphery of the top wall with the outer side wall having upper and lower ends. A stabilizing snap-ring is provided at the lower end of the outer side wall of the separator tray which extends laterally outwardly therefrom for selective reception in the snap-ring groove in the lower end of the upper side wall of the pot. The top wall of the separator tray has first, second and third spaced-apart plant pot receiving openings formed therein, each of which are adapted to receive and support a plant pot therein.

It is therefore a principal object of the invention to provide an improved garden pot assembly.

A further object of the invention is to provide a garden pot assembly which may be circular, rectangular, square or oval shaped in plan view.

A further object of the invention is to provide a garden pot assembly which is inexpensive to manufacture.

A further object of the invention is to provide a garden pot which is easy to assemble.

A further object of the invention is to provide a garden pot which is visually appealing.

A further object of the invention is to provide a garden pot assembly including a pot having a separator tray snap-fitted into the upper end thereof with the separator tray having a plurality of spaced-apart plant pot receiving openings formed therein each of which are adapted to receive and support a plant pot therein.

A further object of the invention is to provide a garden pot assembly wherein the pot of the assembly includes a unique bottom structure.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
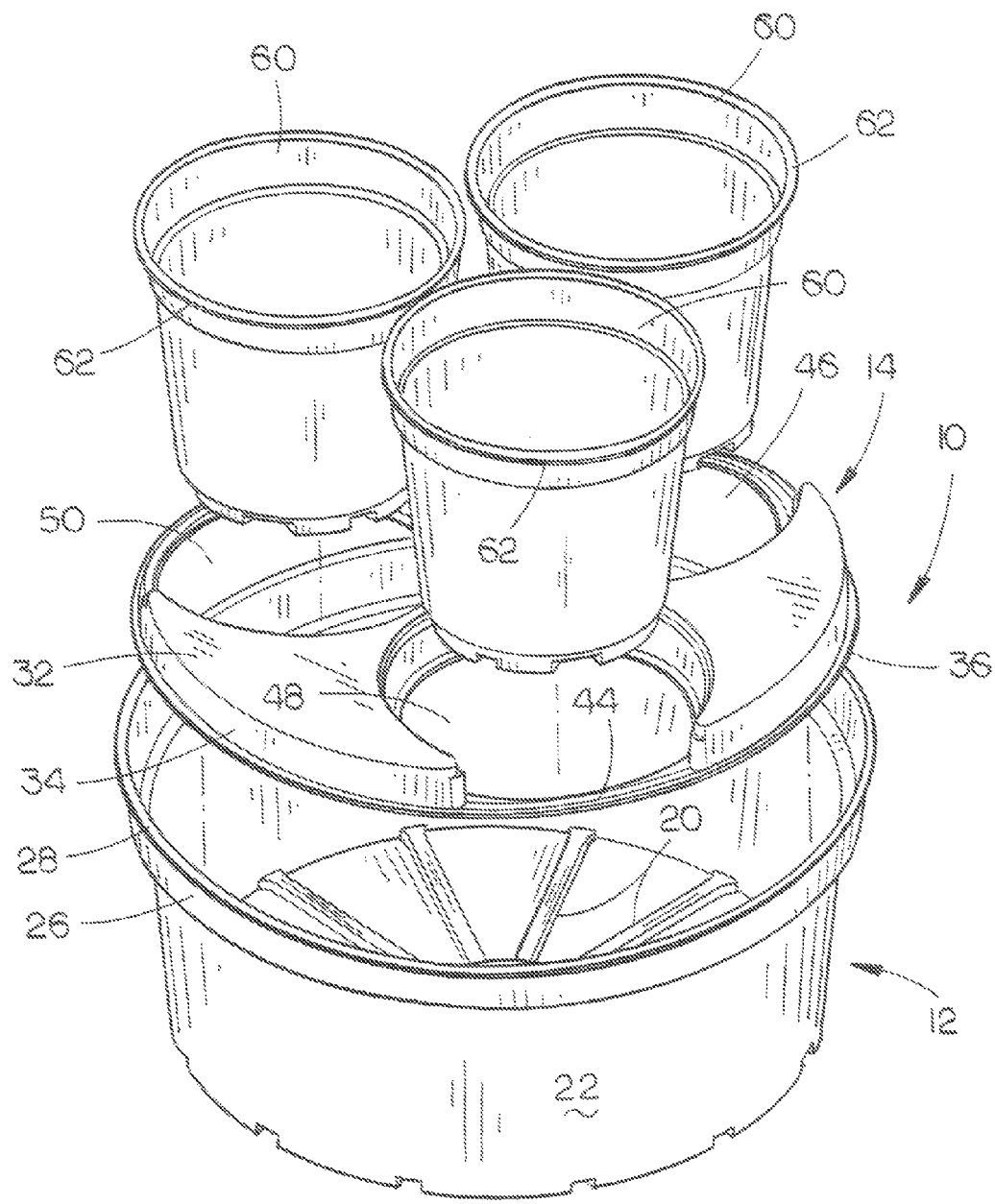
FIG. 1 is an exploded perspective view of the garden pot assembly of his invention.
Figure 2:
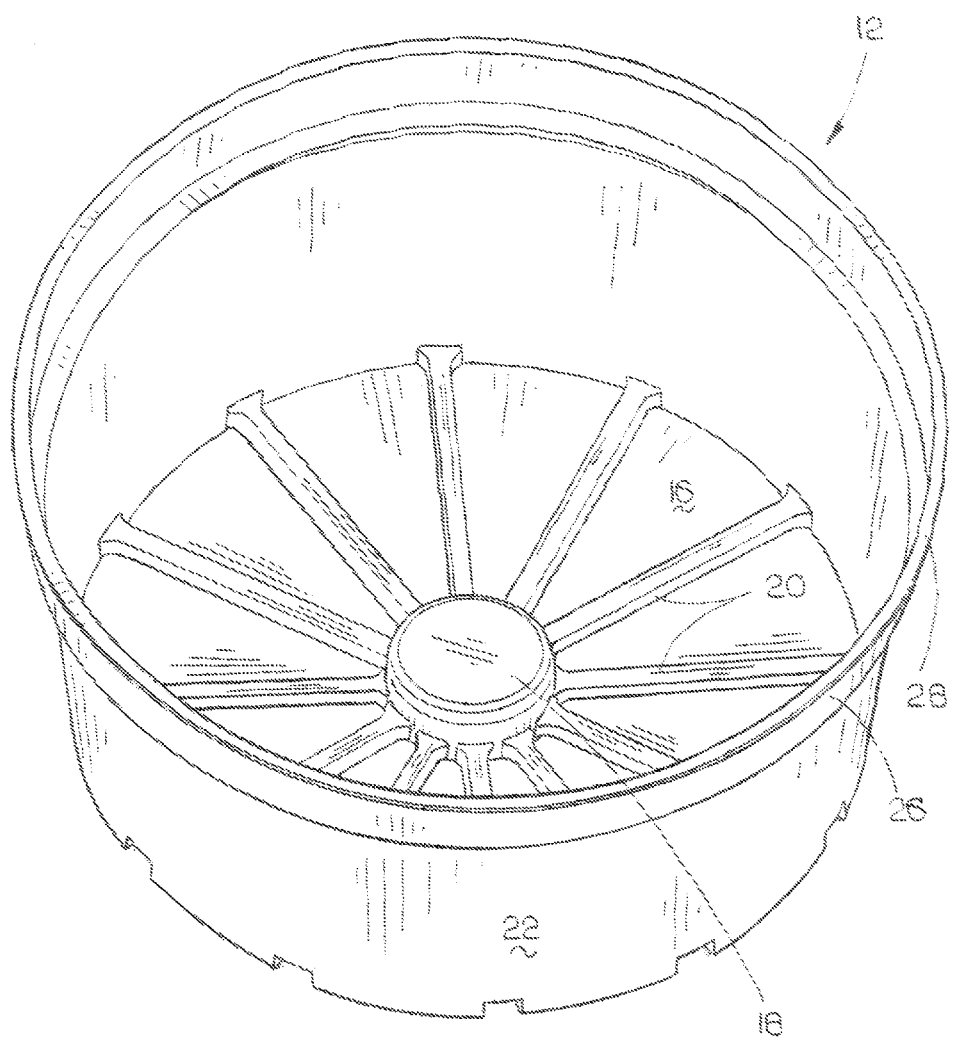
FIG. 2 is a perspective view of the pot of the garden pot assembly of this invention.
Figure 3:
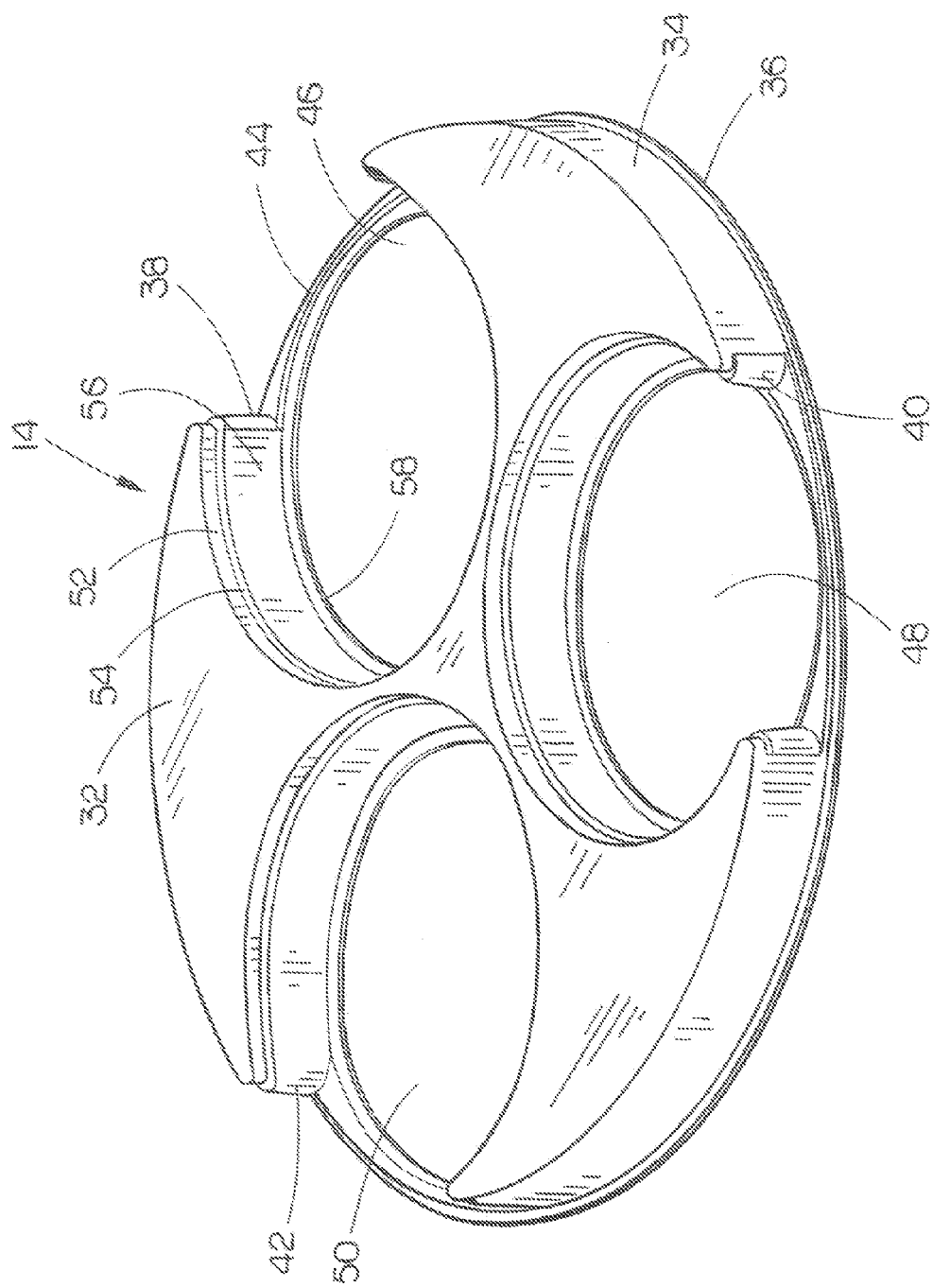
FIG. 3 is a perspective view of the separator tray of the garden pot assembly of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the garden pot assembly of this invention which is comprised of a pot 12 and a plant separator or arrangement tray 14, both of which are preferably comprised of a plastic material such as polyethylene terephthalate.

Pot 12 includes a circular bottom wall 16 having an upstanding hub 18 at the center thereof. A plurality of upstanding and radially spaced supports, ribs or stand-offs 20 extend outwardly from the lower end of hub 18 to the periphery of the bottom wall 16. As seen, the upper ends of the stand-offs 20 dwell in a plane below the upper end of the hub 18. Pot 12 includes a tapered generally cylindrical lower side wall section 22 which extends upwardly and outwardly from the periphery of bottom wall 16. The upper end of lower side wall section 22 terminates in a laterally extending ledge or shelf 24. Pot 12 also includes an upper side wall section 26 which extends upwardly and outwardly from the outer end of ledge 24. A small lip 28 extends laterally outwardly from the upper end of the upper side wall section 26. An outwardly extending ring snap-in groove 30 is formed in the lower end of upper wall section 26 at its juncture with ledge 24.

Separator tray 14 includes a circular, horizontally disposed top wall 32, having an outer side wall 34 extending downwardly from the periphery thereof. The lower end of side wall 34 has a snap-ring 36 extending laterally outwardly therefrom. The side wall 34 has three cut-outs 38, 40 and 42 formed therein primarily to conserve plastic material. In the cut-outs 38, 40 and 42, the snap-ring 36 Includes an upwardly extending rib 44 for strengthening purposes.

Top wall 32 has three semi-circular plant pot receiving openings 46, 48 and 50 formed therein, the outer ends of which communicate with cut-outs 38, 40 and 42 respectively. If the cut-outs 38, 40 and 42 are not formed in the tray 14, the openings 46, 48 and 50 will be circular. A vertically disposed semi-circular wall portion 52 extends downwardly from top wall 32 in opening 46 and has a horizontally disposed semi-circular ledge or shelf 54 extending laterally from the lower end thereof. A vertically disposed semi-circular wall portion 56 extends downwardly from the outer end of ledge 54. A circular lip 58 extends laterally from the lower end of wall portion 56. As seen, the lip 58 has a portion thereof which is integrally formed with the snap-ring 36 in the cut-out 38. If the openings 46, 48 and 50 are circular, wall portion 52 will be circular, ledge 54 will be circular, wall portion 56 will be circular and lip 58 will be circular. Inasmuch as the semi-circular wall portion, semi-circular ledge or shelf, semi-circular wall portion and lip associated with the openings 48 and 50 are identical to that just described with respect to opening 46, that structure will not be described in detail.

The numeral 60 refers to plant pots which are inserted into the openings 46, 48 and 50. Each of the plant pots 60 have a lip 62 which extends outwardly from the upper end thereof. Each of the bottoms 64 of the plant pots 60 have drainage openings 66 formed therein A different plant species will normally be planted in each of the plant pots 60.

Figure 4:
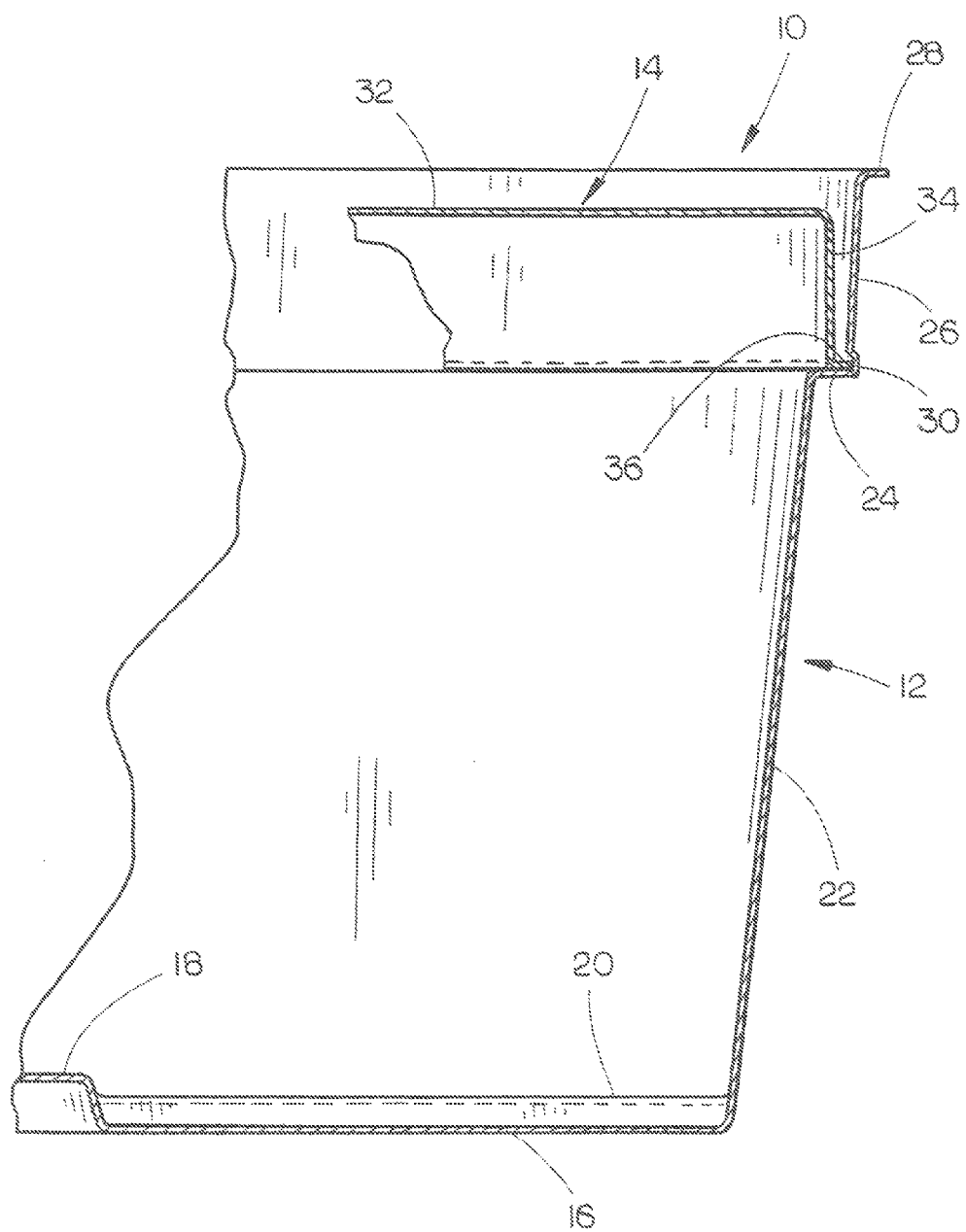
FIG. 4 is a partial sectional view of the pot of the garden pot assembly of this invention.
Figure 5:
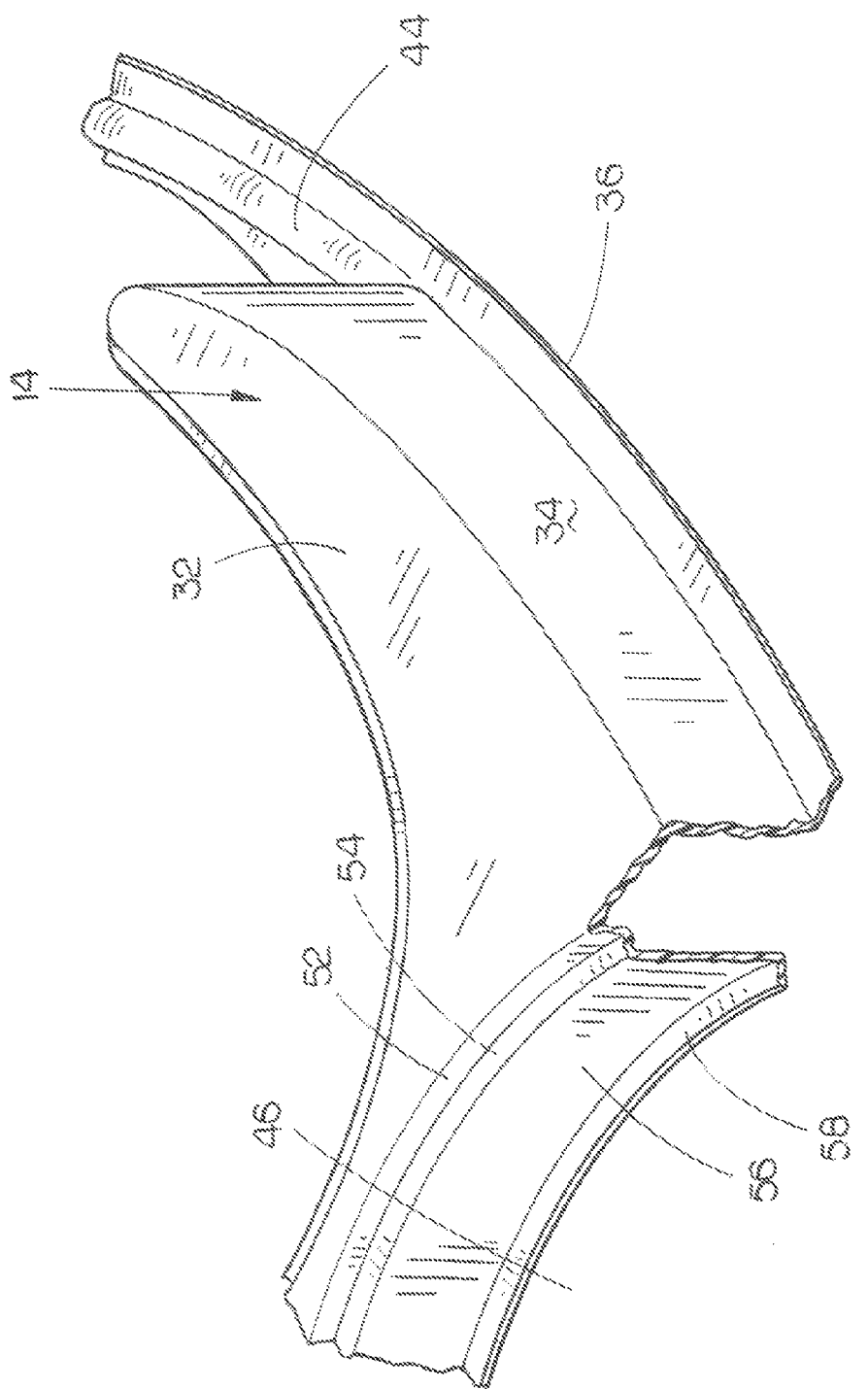
FIG. 5 is a partial perspective view of a portion of the separator tray with a portion thereof cut-away to more fully illustrate the invention.
Figure 6:
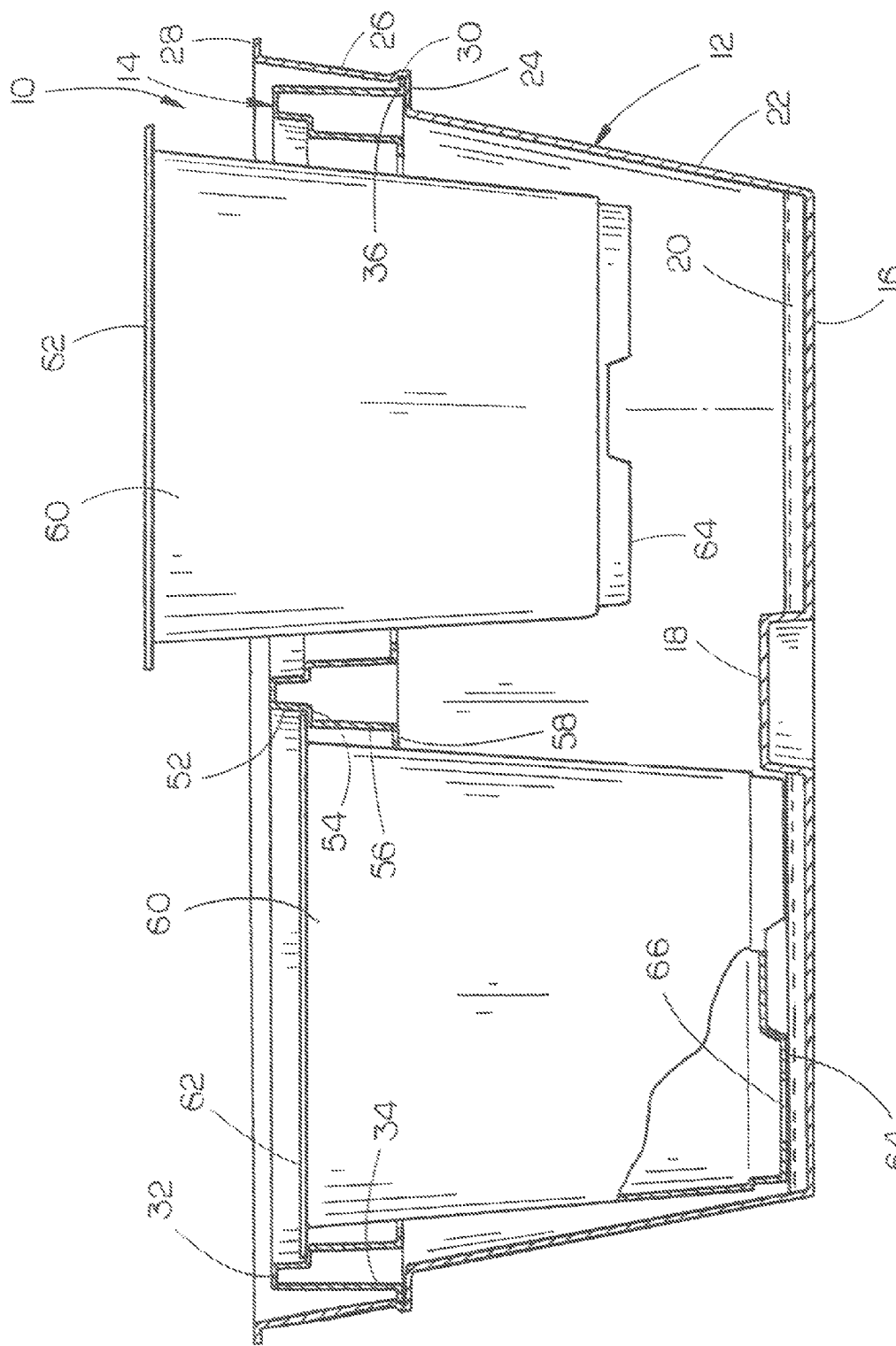
FIG. 6 is a sectional view of one plant pot fully positioned in the garden pot assembly and one plant pot being partially inserted into the garden pot assembly.
Figure 7:
FIG. 7 is a perspective view illustrating three different species of plants within the garden pot assembly which is covered with a decorative wrap.

The garden pot assembly 10 is assembled and used as will now be described. The separator tray 14 is inserted downwardly into the open upper end of the pot 12 until the snap-ring 36 of the tray 14 is snap-fitted into the snap-ring groove 30, as seen in FIGS. 4 and 6. The positioning of the snap-ring 36 in the ring snap-in groove 30 stabilizes the tray 14 and ensures that the tray 14 will remain in the proper position.

Each of the plant pots 60 will be filled with a different plant species. If necessary, soil or other material may be added to the plant pot. The plant pots 60 are then inserted downwardly into the openings 44, 48 and 50 until the lips or flanges 62, at the upper end of the pots 60, rest on the ledges 54 or until the bottoms 64 thereof, which have drainage openings 66 formed therein, rest on the stand-offs 20. The lower ends of the plant pots 60 will be maintained in the proper position by the hub 18 as seen in FIG. 6.

Figure 8:
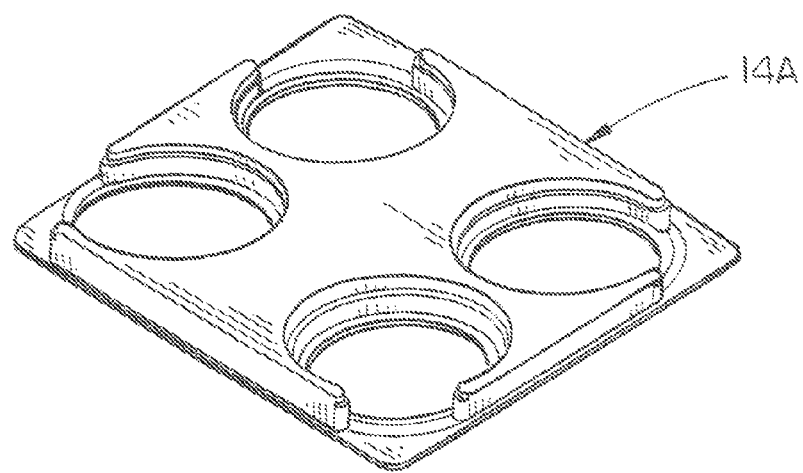
FIG. 8 is a perspective view of a second form of the separator tray.
Figure 9:
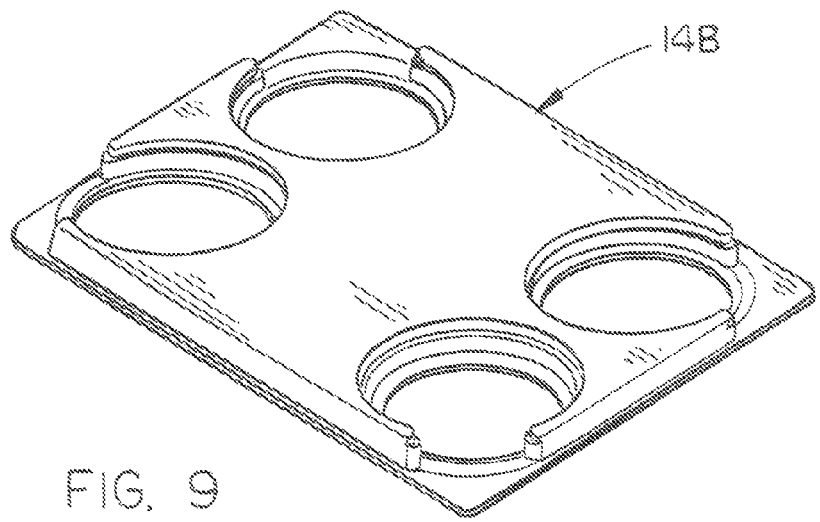
FIG. 9 is a perspective view of a third form of the separator tray.
Figure 10:
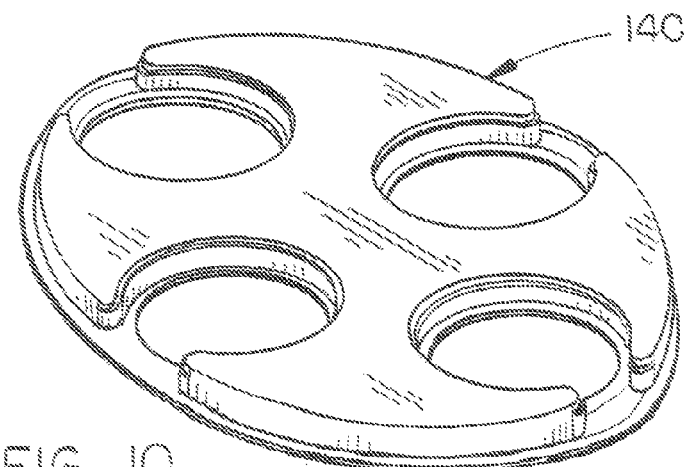
FIG. 10 is a perspective view of a fourth form of the separator tray.
Figure 11:
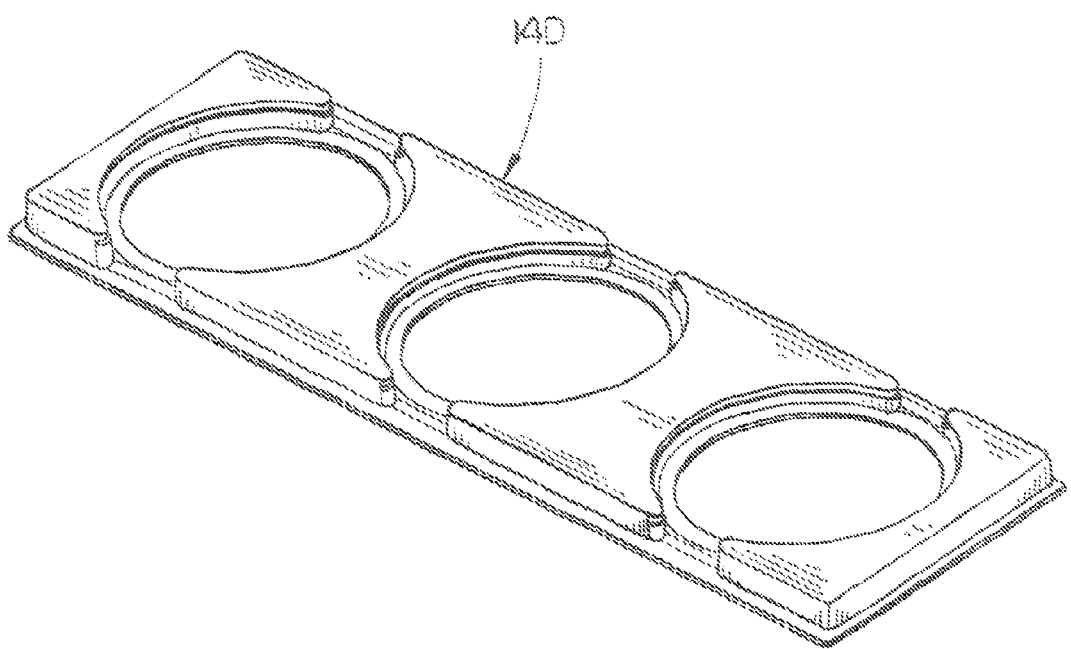
FIG. 11 is a perspective view of a fifth form of the separator tray.

Although the preferred shape of the pot 12 and the separator 14 is that shown in FIGS. 1-7, the pot 12 and the tray 14 may have different shapes. FIG. 8 illustrates a separator tray 14A which is square-shaped to fit into a pot having a square shape. FIG. 9 illustrates a tray 14B which is rectangular so as to fit into a pot having a rectangular shape. FIG. 10 illustrates a tray 14C which is circular, having four plant pot receiving openings formed therein. FIG. 11 illustrates a tray 14C which is rectangular but which has four plant pot receiving openings formed therein.

The trays may have any number of plant pot openings formed therein. Further, the diameters of the plant pot openings may vary so as to have different diameters in a single tray.

The individual plant pots 60 will be individually watered in an amount dependent upon the particular plant species therein. Excess water draining from the bottoms of the plant pots 60 will collect between the stand-offs 20. If the plants are not going to be watered for several days or so, water may be added to the bottom of the pot 12 so that the water level in the pat 12 will initially be above the stand-offs 20 to enable water to pass upwardly into the plant pots 60 through the drainage openings 66 in the bottoms 64 thereof.

The garden pot assembly of this invention permits the individual watering of the different plant species as stated above. The garden pot assembly 10 is easily assembled and is stable in use. The garden pot assembly 10 is relatively inexpensive to manufacture and is reusable.

Thus, it can be seen that the invention accomplishes at least 1 of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. A garden pot assembly, comprising:
a pot having a horizontally disposed circular bottom wall; said pot having a generally cylindrical lower side wall, having upper and lower ends, extending upwardly and outwardly from the periphery of said bottom wall; a ring-shaped shelf, having inner and outer ends, extending laterally outwardly from said upper end of said lower side wall; a generally cylindrical upper side wall, having upper and lower ends, extending upwardly and outwardly from said outer end of said shelf; said lower end of said upper side wall having a ring snap-in groove formed therein which extends laterally outwardly therefrom at the juncture of said upper side wall and said shelf;
a separator tray including a horizontally disposed circular top wall and an outer side wall extending downwardly from the periphery of said top wall with said outer side wall having upper and lower ends;

and a stabilizing snap-ring at said lower end of said outer side wall of said separator tray which extends laterally outwardly therefrom for selective reception in said ring snap-in groove in said lower end of said upper side wall of said pot;

said top wall of said separator tray having first, second and third spaced-apart pot receiving openings formed therein each of which are adapted to receive and support a plant pot therein.

2. The garden pot assembly of claim 1 wherein said outer side wall of said separator tray has first, second and third cut-outs formed therein which intersect said first, second and third pot openings respectively.

3. The garden pot assembly of claim 1 wherein said pot and said separator tray are comprised of a plastic material.

4. The garden pot assembly of claim 2 wherein said snap-ring has a reinforcing rib associated therewith at said cut-outs.

5. The garden pot assembly of claim 1 wherein said separator tray includes a plant pot supporting structure which extends at least partially around each of said first, second and third plant pot receiving openings, said plant pot supporting structure including a vertically disposed first wall portion, having upper and lower ends, which extends downwardly from said top wall of said separator tray, a horizontally disposed ledge extending laterally outwardly from said lower end of said first wall portion, a vertically disposed second wall portion, having upper and lower ends, extending downwardly from said outer end of said ledge, and a horizontally extending lip extending laterally outwardly from said lower end of said second wall portion.

6. The garden pot assembly of claim 1 wherein a centrally disposed hub extends upwardly from said bottom wall of said pot and wherein a plurality of elongated, radially spaced-apart stand-offs extend horizontally outwardly from said hub to the periphery of said bottom wall.

7. The garden pot assembly of claim 6 wherein each of said stand-offs has an upper end which dwells in a plane below the upper end of said hub.

8. A garden pot assembly, comprising:

a container having a horizontally disposed bottom wall; said container having a lower side wall, having upper and lower ends, extending upwardly and outwardly from the periphery of said bottom wall; a shelf, having inner and outer ends, extending laterally outwardly from said upper end of said lower side wall; an upper side wall having upper and lower ends, extending upwardly and outwardly from said outer end of said shelf; said lower end of said upper side wall having a ring snap-in groove formed therein which extends outwardly therefrom at the juncture of said upper side wall and said shelf;

a separator tray including a horizontally disposed top wall and an outer side wall extending downwardly from the periphery of said top wall with said outer side wall having upper and lower ends;

and a stabilizing snap-ring at said lower end of said outer side wall of said separator tray which extends laterally outwardly therefrom for selective reception in said ring snap-in groove in said lower end of said upper side wall of said container;

said top wall of said separator tray having first, second and third spaced-apart plant pot receiving openings formed therein each of which are adapted to receive and support a plant pot therein.

9. The garden pot assembly of claim 8 wherein said container and said separator tray are oval shaped in plan view.

10. The garden pot assembly of claim 8 wherein said container and said separator tray are square-shaped in plan view.

11. The garden pot assembly of claim 8 wherein said container and said separator tray are rectangular in plan view.

12. The garden pot assembly of claim 8 wherein said plant pot receiving openings have different diameters.

* * * * *